(12) United States Patent
Morgado

(10) Patent No.: US 6,739,307 B2
(45) Date of Patent: May 25, 2004

(54) INTERNAL COMBUSTION ENGINE AND METHOD

(76) Inventor: Ralph Gordon Morgado, 24332 N. Watkinson Rd., Acampo, CA (US) 95220

( * ) Notice: Subject to any disclaimer, the term of this patent is extended or adjusted under 35 U.S.C. 154(b) by 0 days.

(21) Appl. No.: 10/108,186

(22) Filed: Mar. 26, 2002

(65) Prior Publication Data
US 2003/0200951 A1 Oct. 30, 2003

(51) Int. Cl.[7] .............................................. F02B 53/00
(52) U.S. Cl. ......................... 123/245; 123/243; 418/36
(58) Field of Search ................. 123/245, 43 B, 123/243; 418/34–38

(56) References Cited

U.S. PATENT DOCUMENTS

| | | | |
|---|---|---|---|
| 1,482,628 A | | 2/1924 | Bullington |
| 1,568,051 A | * | 1/1926 | Bullington .................. 123/245 |
| 1,568,052 A | | 1/1926 | Bullington .................. 123/245 |
| 1,568,053 A | | 1/1926 | Bullington .................. 123/245 |
| 1,579,207 A | | 4/1926 | Bullington .................. 418/36 |
| 1,778,182 A | | 10/1930 | Bullington |
| 1,821,139 A | | 9/1931 | Bullington |
| 1,829,391 A | | 10/1931 | Bullington |
| 1,904,892 A | * | 4/1933 | Trube .......................... 418/38 |
| 2,182,269 A | * | 12/1939 | Whritenour ................. 123/245 |
| 2,413,589 A | * | 12/1946 | Snyder ........................ 123/245 |
| 2,988,065 A | | 6/1961 | Wankel et al. |
| 3,359,954 A | | 12/1967 | Eiermann et al. |
| 3,396,632 A | * | 8/1968 | LeBlanc ...................... 123/245 |
| 3,592,571 A | * | 7/1971 | Drury .......................... 418/36 |
| 3,645,239 A | * | 2/1972 | Cena ........................... 123/245 |
| 3,688,749 A | | 9/1972 | Wankel |
| 3,909,162 A | * | 9/1975 | Ata ............................. 123/245 |
| 3,937,187 A | | 2/1976 | Bergen ........................ 418/36 |
| 3,990,405 A | * | 11/1976 | Kecik ......................... 123/245 |
| 4,026,249 A | | 5/1977 | Larrea ........................ 123/245 |
| 4,032,268 A | | 6/1977 | Wankel |
| 4,035,111 A | | 7/1977 | Cronen, Sr. ................. 418/35 |
| 4,068,985 A | * | 1/1978 | Baer ........................... 418/36 |
| 4,169,697 A | * | 10/1979 | Doundoulakis .............. 418/34 |
| 4,561,836 A | | 12/1985 | Wankel |
| 5,199,391 A | | 4/1993 | Kovalenko ................ 123/43 B |
| 5,233,954 A | | 8/1993 | Chomyszak |

(List continued on next page.)

OTHER PUBLICATIONS

Pekau et al. Variable Geometry Toroidal Engine Overview. Sep. 19, 2000. VGT Technologies, Inc., Calgary, Alberta, Canada.

Primary Examiner—Thomas Denion
Assistant Examiner—Thai Ba Trieu
(74) Attorney, Agent, or Firm—Edward S. Wright

(57) ABSTRACT

Internal combustion engine and method in which pistons on different rotors move relative to each other to form chambers of variable volume in a toroidal cylinder. The pistons move in stepwise fashion, with the pistons on one rotor travelling a predetermined distance while the pistons on the other rotor remain substantially stationary. Fuel is drawn into a chamber as one of the pistons defining the chamber moves away from the other, and then compressed as the second piston moves toward the first. Combustion of the fuel drives the first piston away from the second, and the spent gases are then expelled from the chamber by the second piston moving again toward the first. An output shaft is connected to the rotors in such manner that the shaft rotates continuously while the rotors and pistons move in their stepwise fashion.

35 Claims, 11 Drawing Sheets

U.S. PATENT DOCUMENTS

| | | |
|---|---|---|
| 5,242,288 A | 9/1993 | Vincent |
| 5,433,179 A * | 7/1995 | Wittry .................. 123/245 |
| 5,501,182 A * | 3/1996 | Kull et al. .................. 418/36 |
| 5,622,149 A * | 4/1997 | Wittry .................. 123/245 |
| 5,797,366 A | 8/1998 | Adamovski |
| 6,132,197 A | 10/2000 | Adamovski et al. |
| 6,250,277 B1 | 6/2001 | Adamovski et al. |
| 6,341,590 B1 | 1/2002 | Barrera et al. .............. 123/245 |
| 6,446,595 B1 * | 9/2002 | Sakita .................. 123/245 |
| 6,457,451 B1 * | 10/2002 | Sakita .................. 123/245 |
| 6,457,452 B1 * | 10/2002 | Sakita .................. 123/245 |
| 6,488,004 B1 | 12/2002 | Adamovski |

* cited by examiner

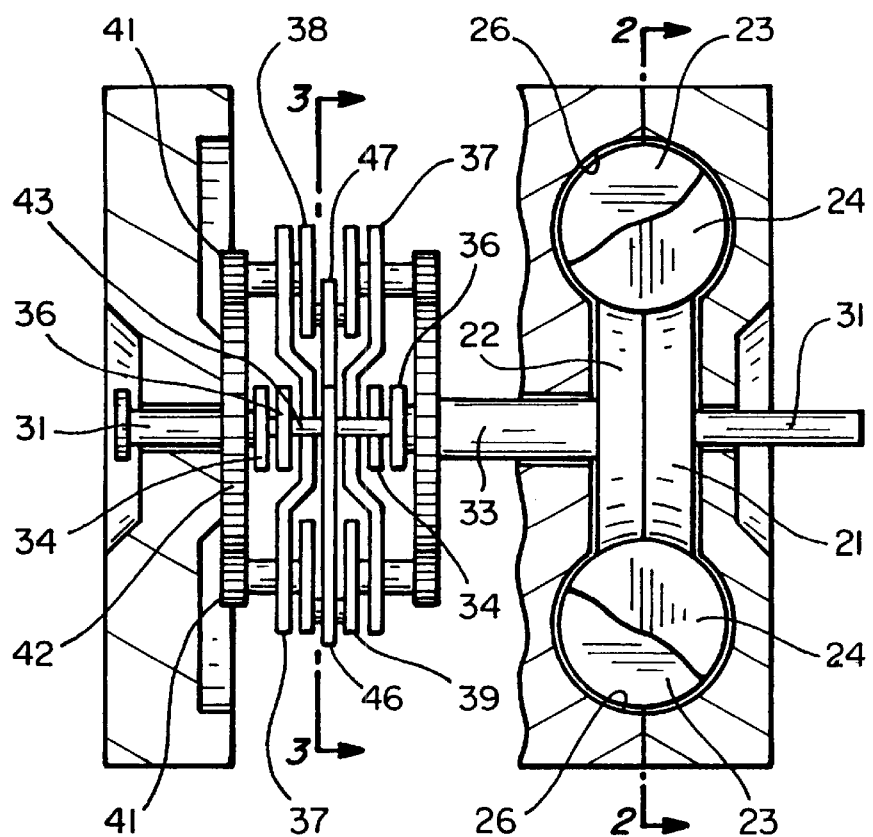
FIG_1
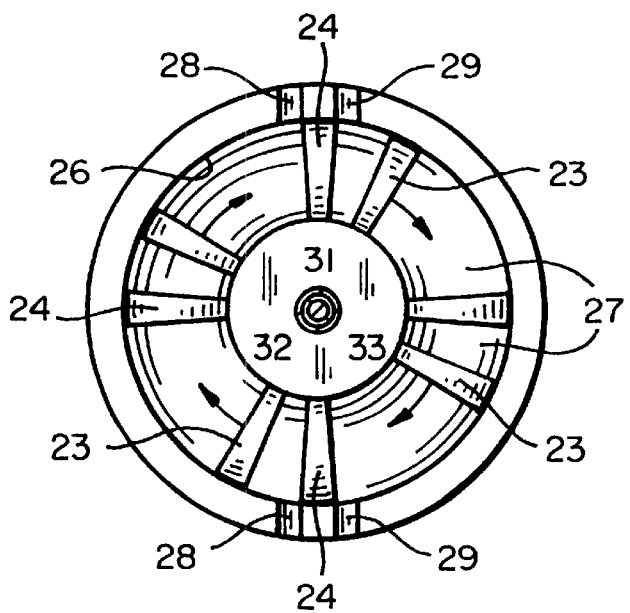
FIG_2

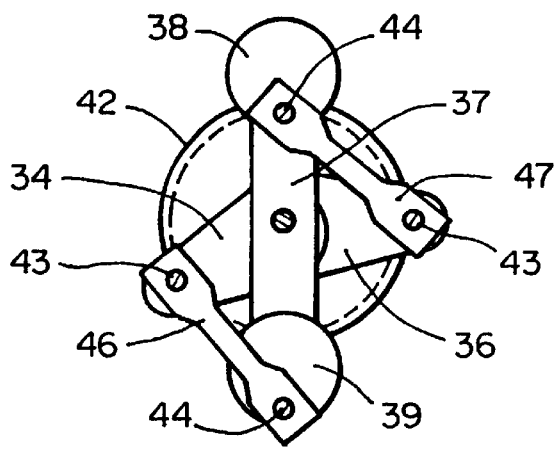
FIG_3
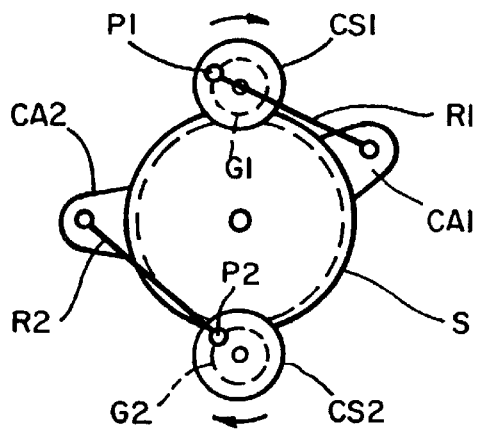
FIG_4A
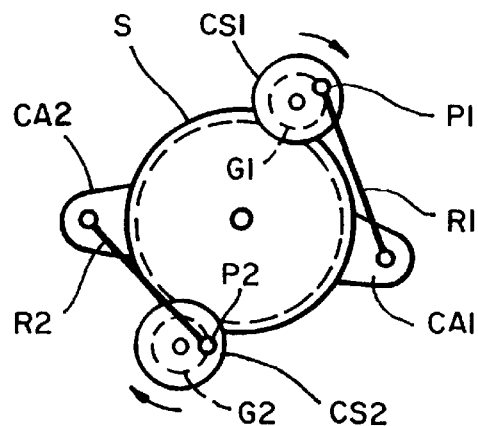
FIG_4B
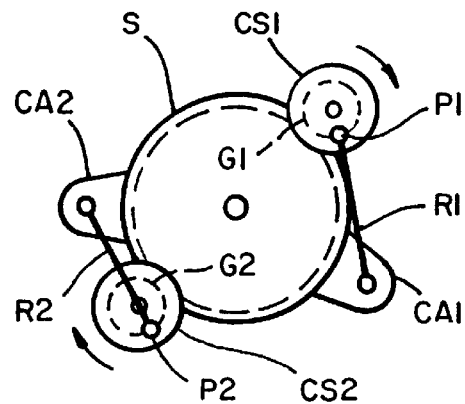
FIG_4C

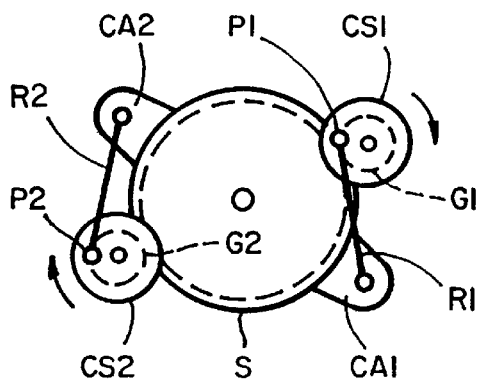
FIG_4D
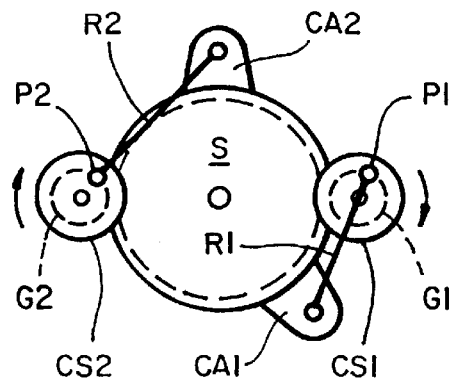
FIG_4E
| OUTPUT SHAFT | CRANK | PISTON |
|---|---|---|
| 0° | 0° | 0° |
| 5° | 20° | 5° |
| 10° | 40° | 10° |
| 15° | 60° | 11.5° |
| 20° | 80° | 12° |
| 25° | 100° | 12° |
| 30° | 120° | 11.5° |
| 35° | 140° | 11.5° |
| 40° | 160° | 12.5° |
| 45° | 180° | 17.5° |
| 50° | 200° | 23° |
| 55° | 220° | 31° |
| 60° | 240° | 41° |
| 65° | 260° | 50° |
| 70° | 280° | 59.5° |
| 75° | 300° | 68.5° |
| 80° | 320° | 76.5° |
| 85° | 340° | 84° |
| 90° | 360° | 90° |
FIG_5

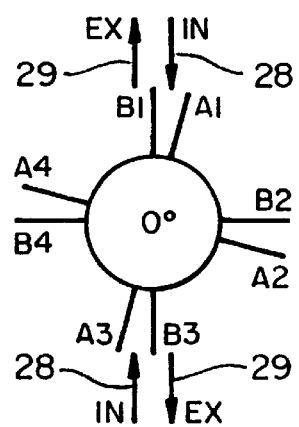
FIG_6A
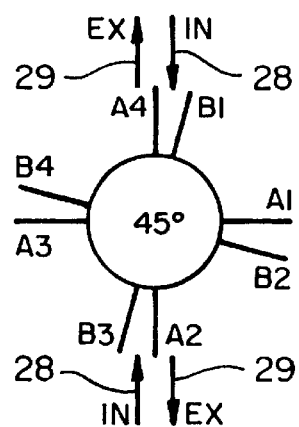
FIG_6B
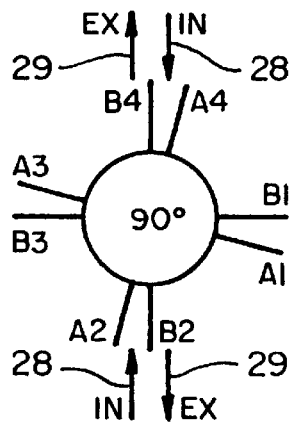
FIG_6C
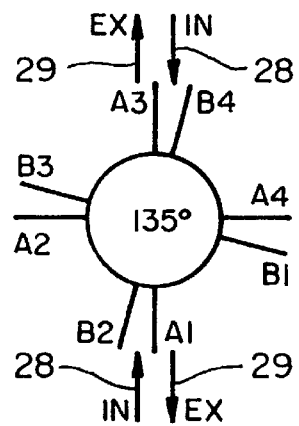
FIG_6D
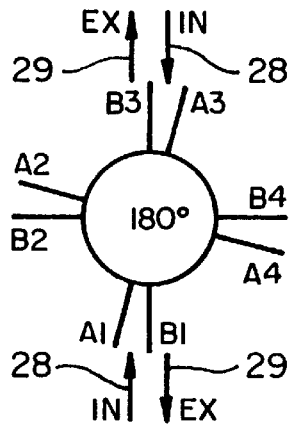
FIG_6E
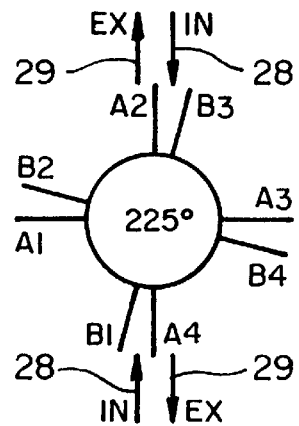
FIG_6F

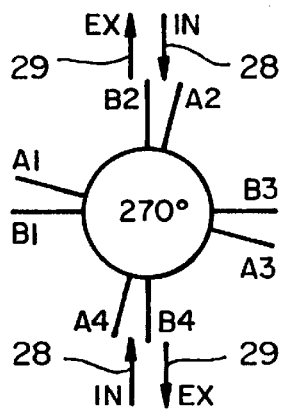

FIG_6G

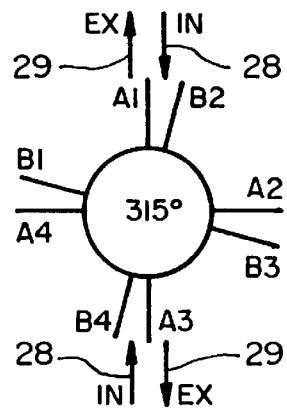

FIG_6H

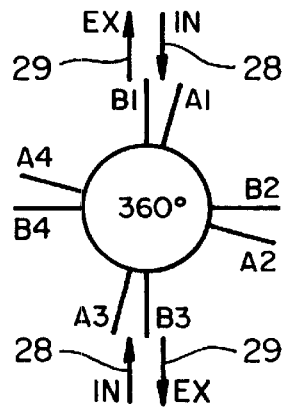

FIG_6I

| SHAFT POS | A1,B1 | A1,B2 | A2,B2 | A2,B3 | A3,B3 | A3,B4 | A4,B4 | A4,B1 |
|---|---|---|---|---|---|---|---|---|
| 0°-45° | INTAKE | COMP | POWER | EXH | INTAKE | COMP | POWER | EXH |
| 45°-90° | COMP | POWER | EXH | INTAKE | COMP | POWER | EXH | INTAKE |
| 90°-135° | POWER | EXH | INTAKE | COMP | POWER | EXH | INTAKE | COMP |
| 135°-180° | EXH | INTAKE | COMP | POWER | EXH | INTAKE | COMP | POWER |
| 180°-225° | INTAKE | COMP | POWER | EXH | INTAKE | COMP | POWER | EXH |
| 225°-270° | COMP | POWER | EXH | INTAKE | COMP | POWER | EXH | INTAKE |
| 270°-315° | POWER | EXH | INTAKE | COMP | POWER | EXH | INTAKE | COMP |
| 315°-360° | EXH | INTAKE | COMP | POWER | EXH | INTAKE | COMP | POWER |

FIG_7

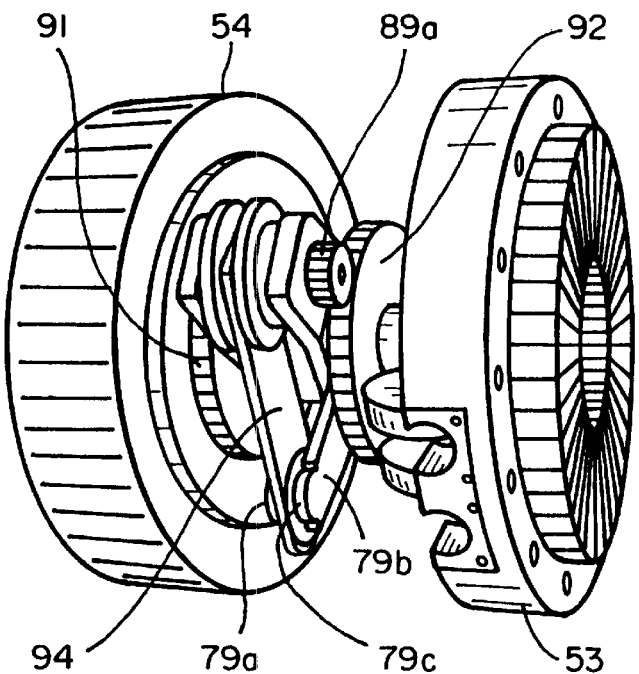
FIG_8
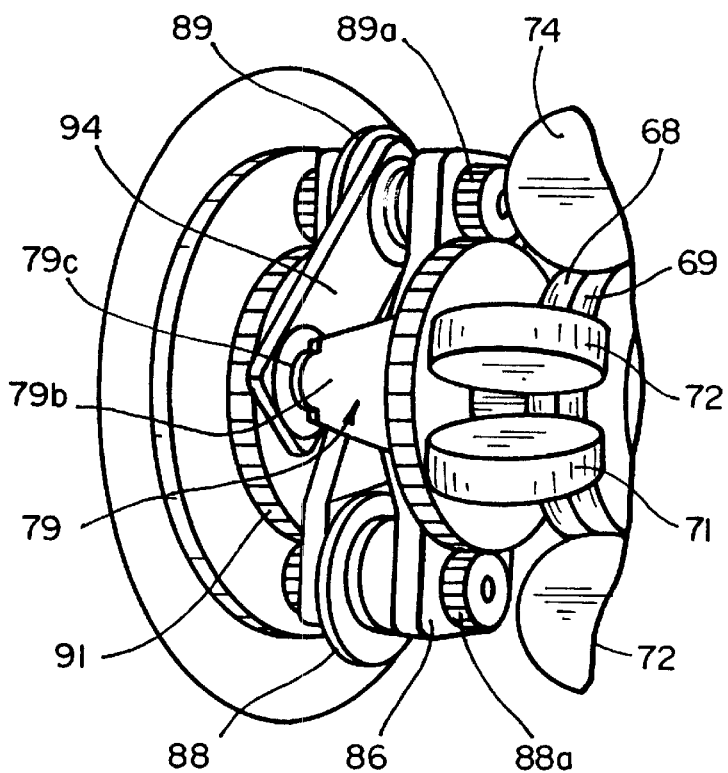
FIG_9

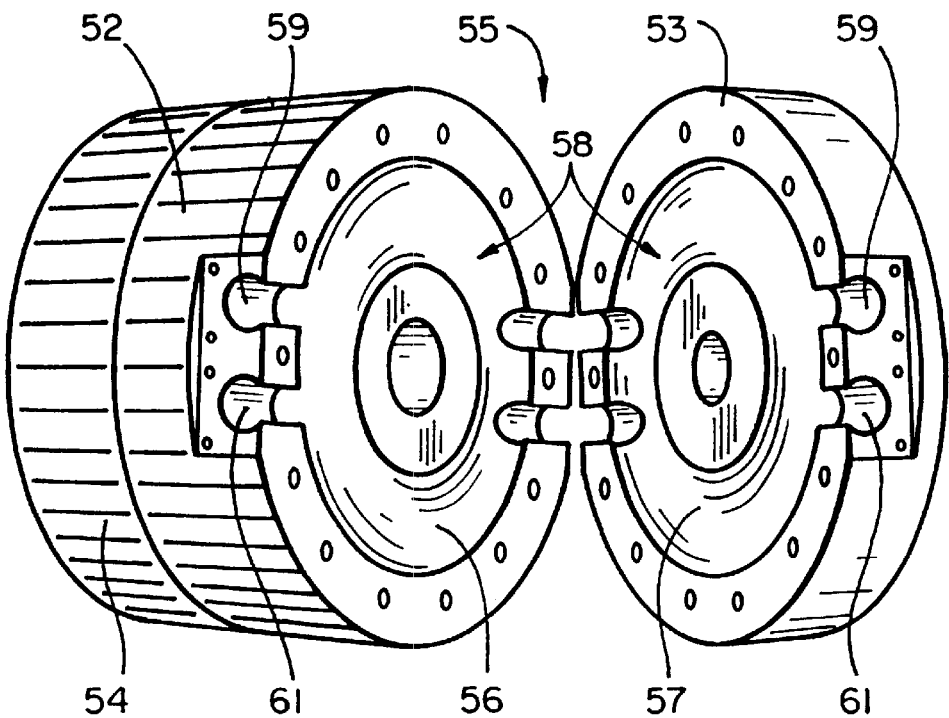
FIG_10
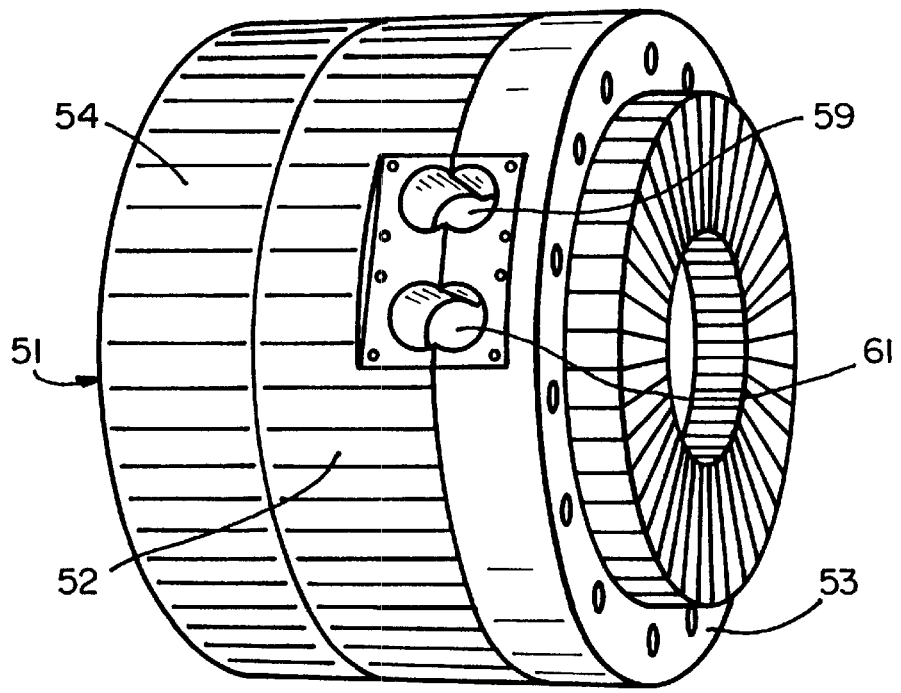
FIG_11

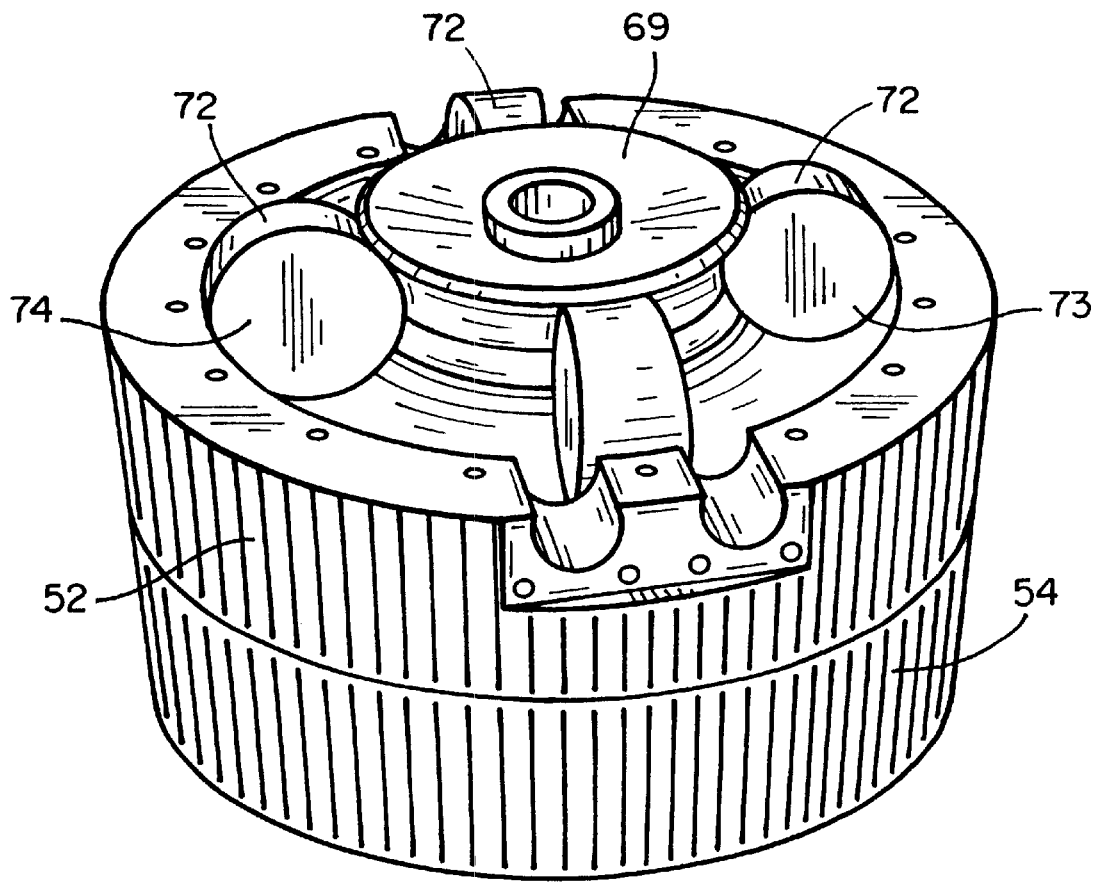
FIG_12
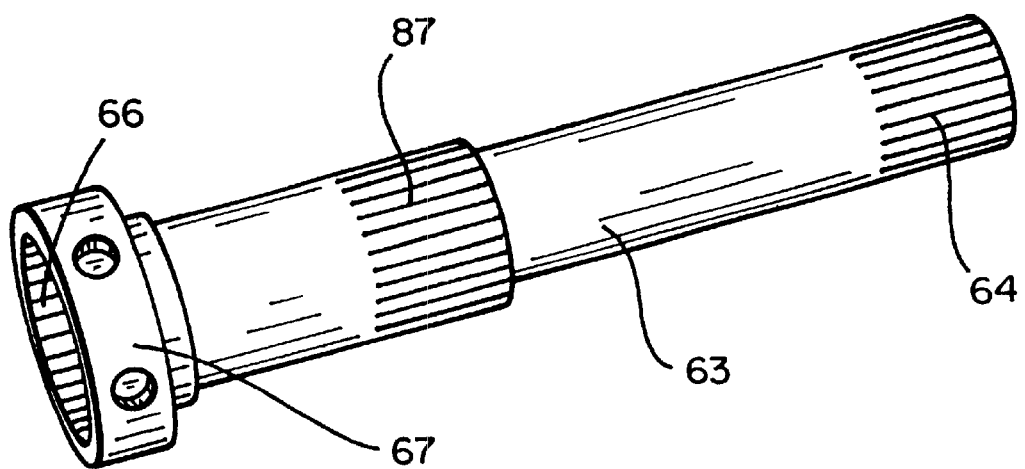
FIG_13

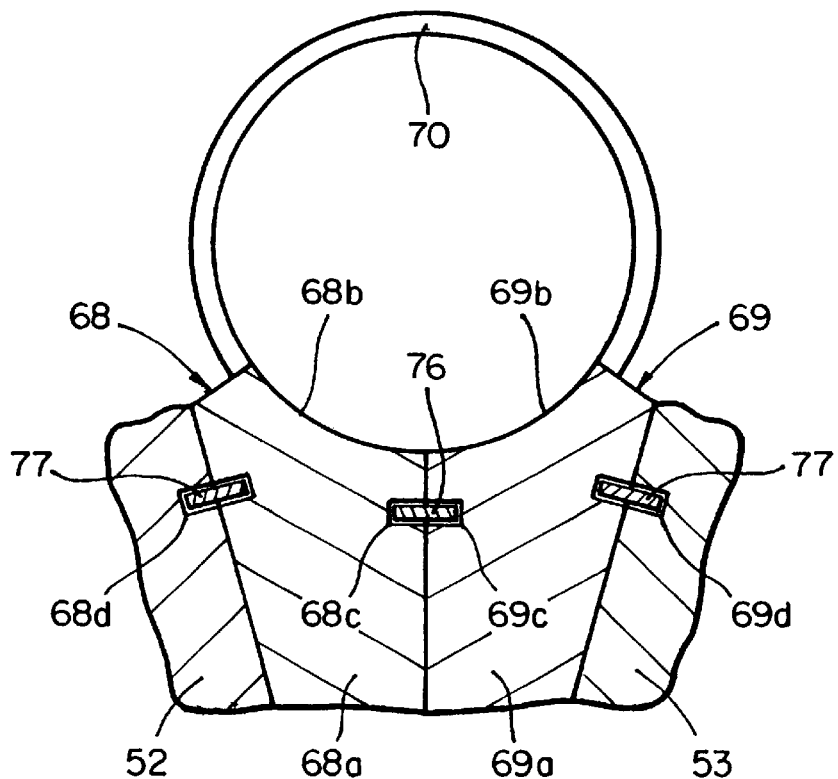
FIG_14
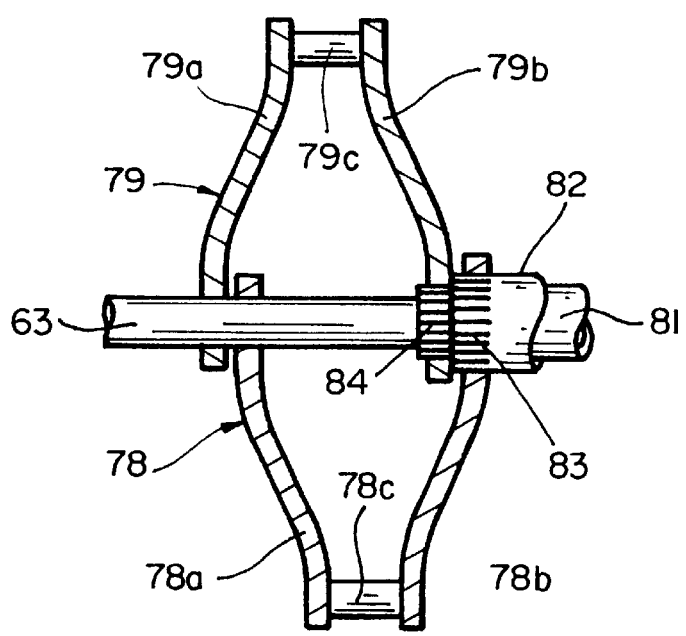
FIG_15

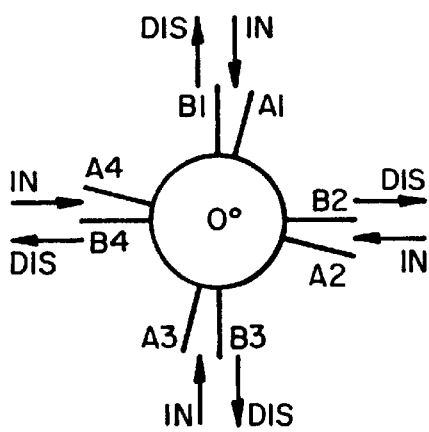
FIG_16A
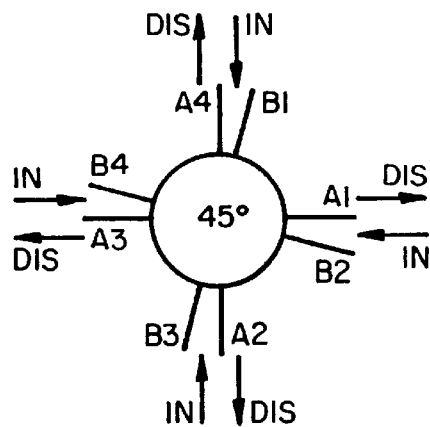
FIG_16B
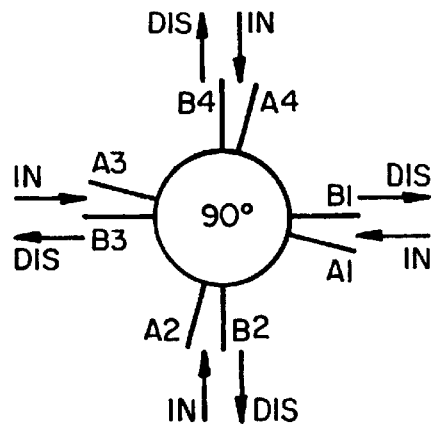
FIG_16C
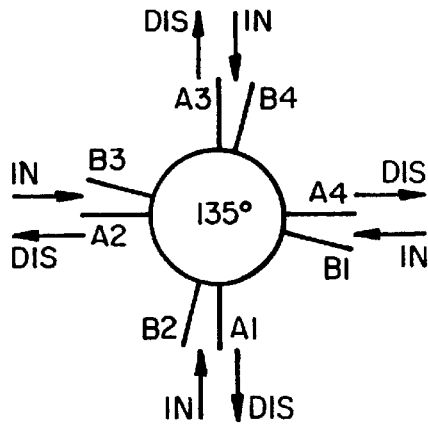
FIG_16D
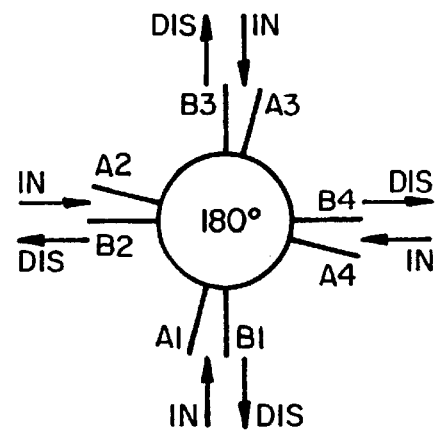
FIG_16E
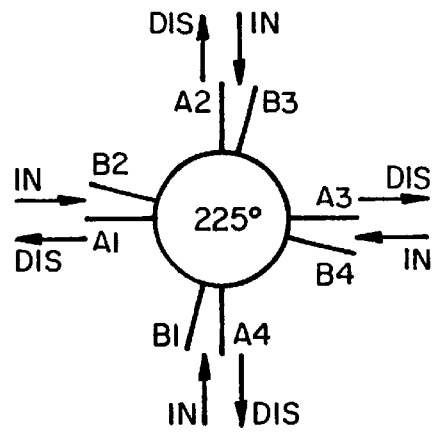
FIG_16F

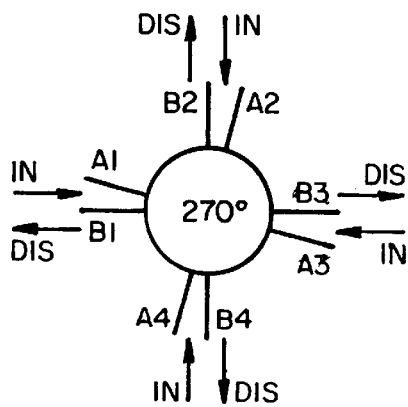

FIG_16G

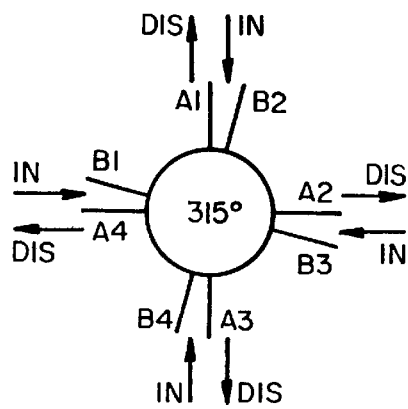

FIG_16H

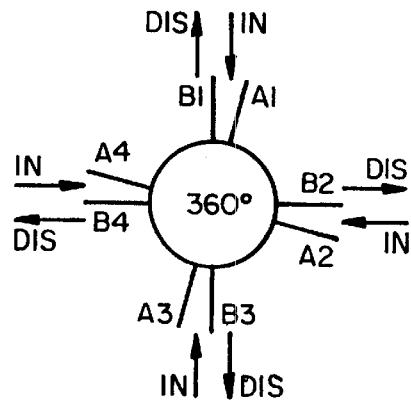

FIG_16I

| SHAFT POS | A1,B1 | A1,B2 | A2,B2 | A2,B3 | A3,B3 | A3,B4 | A4,B4 | A4,B1 |
|---|---|---|---|---|---|---|---|---|
| 0°-45° | INTAKE | DISCH | INTAKE | DISCH | INTAKE | DISCH | INTAKE | DISCH |
| 45°-90° | DISCH | INTAKE | DISCH | INTAKE | DISCH | INTAKE | DISCH | INTAKE |
| 90°-135° | INTAKE | DISCH | INTAKE | DISCH | INTAKE | DISCH | INTAKE | DISCH |
| 135°-180° | DISCH | INTAKE | DISCH | INTAKE | DISCH | INTAKE | DISCH | INTAKE |
| 180°-225° | INTAKE | DISCH | INTAKE | DISCH | INTAKE | DISCH | INTAKE | DISCH |
| 225°-270° | DISCH | INTAKE | DISCH | INTAKE | DISCH | INTAKE | DISCH | INTAKE |
| 270°-315° | INTAKE | DISCH | INTAKE | DISCH | INTAKE | DISCH | INTAKE | DISCH |
| 315°-360° | DISCH | INTAKE | DISCH | INTAKE | DISCH | INTAKE | DISCH | INTAKE |

FIG_17

INTERNAL COMBUSTION ENGINE AND METHOD

BACKGROUND OF THE INVENTION

1. Field of Invention

This invention pertains generally to machines such as engines, pumps, and the like and, more particularly, to a positive displacement internal combustion engine and method.

2. Related Art

For more than a century, internal combustion engines have been relied upon a principal source of power in a variety of applications. Of those engines, the most widely used are the reciprocating piston engines which are found in automobiles and other forms of transportation, as well as in a variety of industrial and consumer applications. Such engines can be built in a variety of sizes, depending upon the power requirements of a particular application, ranging from a single cylinder up to 32 cylinders or more. Other types of internal combustion engines such as rotary engines and internally combusted turbines are also used in a number of applications, but not as widely as the reciprocating piston engines.

Smaller internal combustion engines, including the ones used in most automobiles, are powered by gasoline. However, diesel engines are also used in some automobiles, although they are more commonly found in larger applications such as locomotives and ships.

All of these engines have certain limitations and disadvantages. In reciprocating piston engines, the pistons must stop and reverse direction four times per revolution of the output shaft in a 4-stroke engine and two times per output shaft revolution in a 2-stroke engine. Those engines also require rather complex valve systems in order to get the fuel mixture and the exhaust gases into and out of the combustion chambers at the proper times.

Rotary engines such as the Wankel engine (U.S. Pat. No. 2,988,065) avoid the problem of piston stoppage and reversal, and in addition can provide one power stroke for each revolution of the rotor and shaft, whereas a 4-stroke reciprocating piston engine which has only one power stroke for every two revolutions of the shaft. Notwithstanding those advantages, however, rotary engines have found only limited use due to poor fuel economy, short operating life, and dirty exhaust.

OBJECTS AND SUMMARY OF THE INVENTION

It is in general an object of the invention to provide a new and improved internal combustion engine and method.

Another object of the invention is to provide an internal combustion engine and method of the above character which overcome the limitations and disadvantages of the prior art.

Another object of the invention is to provide an internal combustion engine and method of the above character which provide significantly more power strokes per shaft rotation than reciprocating piston engines and rotary engines heretofore provided.

Another object of the invention is to provide an internal combustion engine and method of the above character which provide a large displacement in a small space.

These and other objects are achieved in accordance with the invention by providing an internal combustion engine and method in which pistons on different rotors move relative to each other to form chambers of variable volume in a toroidal cylinder. The pistons move in stepwise fashion, with the pistons on one rotor travelling a predetermined distance while the pistons on the other rotor remain substantially stationary. Fuel is drawn into a chamber as one of the pistons defining the chamber moves away from the other, and then compressed as the second piston moves toward the first. Combustion of the fuel drives the first piston away from the second, and the spent gases are then expelled from the chamber by the second piston moving again toward the first.

The rotors are connected to an output shaft in such manner that the shaft rotates continuously as the pistons and rotors turn in their stepwise fashion to provide smooth, continuous power. In the embodiments disclosed, a pair of crankshafts are mounted on a carrier affixed to the shaft, and rotated continuously about their axes by connecting rods connected to cranks which turn with the rotors. Gears on the crankshafts transfer this continuous rotation to carrier and shaft as they travel about a sun gear disposed coaxially of the shaft.

With four pistons on each rotor and a 4:1 ratio between the sun and crankshaft gears, eight chambers are formed between the pistons, and there are two power strokes in each of those chambers for each revolution of the output shaft. In two shaft revolutions, there are 32 power strokes, which is equivalent to having 32 cylinders in a conventional 4-stroke engine.

BRIEF DESCRIPTION OF THE DRAWINGS

FIG. 1 is a centerline sectional view of one embodiment of a positive displacement engine according to the invention.

FIG. 2 is a cross-sectional view taken along line 2—2 in FIG. 1.

FIG. 3 is an enlarged cross-sectional view taken along line 3—3 in FIG. 1.

FIGS. 4A–4E are diagrams illustrating relationship between the stepwise movement of the rotors and pistons and the continuous rotation of the output shaft in the embodiment of FIGS. 1–3.

FIG. 5 is a table showing the relationship between piston travel and output shaft rotation in a prototype engine similar to the embodiment of FIG. 1.

FIGS. 6A–6I are diagrams illustrating the strokes made by the pistons during one revolution of the output shaft in the embodiment of FIGS. 1–3.

FIG. 7 is a table showing the strokes which occur in all of the chambers in the embodiment of FIGS. 1–3 during 360 degrees of output shaft rotation.

FIG. 8 is an isometric view, partly cut away, of another embodiment of a positive displacement engine according to the invention.

FIG. 9 is a fragmentary isometric view of the crankcase components of the embodiment of FIG. 8 in different operating position.

FIG. 10 is an isometric view of the housing in the embodiment of FIG. 8, with one of the end covers in an open position.

FIG. 11 is a fragmentary isometric view, generally similar to FIG. 10, with the end cover in place.

FIG. 12 is an isometric view of one of the rotors in the embodiment of FIG. 8, with the pistons in the toroidal cylinder.

FIG. 13 is an isometric view of the output shaft in the embodiment of FIG. 8.

FIG. 14 is a fragmentary cross-sectional view of the rotors in the embodiment of FIG. 8.

FIG. 15 is a cross-sectional view of the crank arms in the embodiment of FIG. 8.

FIGS. 16A–16I are diagrams similar to FIGS. 6A–6I, illustrating operation of the engine configured as a pump.

FIG. 17 is a table showing the strokes which occur in all of the chambers when the engine is operated as a pump.

DETAILED DESCRIPTION

As illustrated in FIGS. 1–3, the engine has a pair of rotors 21, 22 with pistons 23, 24 which are spaced circumferentially of the rotors and disposed within a toroidal chamber or cylinder 26. The pistons on the two rotors are interposed between each other around the cylinder, with chambers 27 being formed between successive pistons on the two rotors. As discussed more fully hereinafter, the two rotors turn alternately and in stepwise fashion, with the pistons on one rotor remaining substantially stationary while the pistons on the other advance. Chambers 27 vary in volume as the pistons advance, with the chambers on the back sides of the moving pistons increasing in volume and the chambers on the front sides decreasing. With the alternating movement of the rotors, chambers which increase in volume during one step will decrease during the next.

Fuel is introduced into the chambers through intake ports 28, and spent gases are expelled through exhaust ports 29. The ports are arranged in pairs around the cylinder, with two pairs of ports being positioned directly opposite each other in the embodiment illustrated. The ports communicate openly and directly with the cylinder.

An output shaft 31 extends coaxially of the cylinder and is driven in continuous rotation by the pistons and rotors. Rotor 22 is affixed by a splined connection to a first hollow shaft or sleeve 32 which is rotatively mounted on the output shaft, and rotor 21 is similarly affixed to a second hollow shaft or sleeve 33 which is rotatively mounted on the first. Crank arms 34, 36 are affixed by splines to the other ends of hollow shafts 32, 33 for movement in concert with rotors 21, 22, respectively.

A carrier or carriage 37 is affixed to the output shaft by a splined connection, and a pair of crankshafts 38, 39 are rotatively mounted on the carrier at equal distances from the axis of the output shaft. Planet gears 41 are provided at the ends of the crankshafts, and they mesh with a sun gear 42 which is mounted in a fixed position coaxially of the output shaft. The ratio of the sun and planet gears is preferably the same as the number of pistons on each of the rotors, i.e. n:1, where n is the number of pistons on each rotor. In the embodiment of FIG. 1, there are four pistons on each rotor, and the gear ratio is 4:1. With that ratio, the steps which the pistons make are approximately 90 degrees each, and each of the pistons makes four such steps for each revolution of the output shaft.

Different numbers of pistons and different gear ratios can, of course, be used although the number of pistons per rotor and the gear ratio should preferably be the same, i.e. n pistons per rotor and a gear ratio of n:1. With more pistons and a higher ratio, the piston steps decrease in size and increase in number, and with fewer pistons and a lower gear ratio, the steps increase in size and decrease in number. Thus, for example, with eight pistons per rotor and a gear ratio of 8:1, each piston would make eight steps of 45 degrees each for each rotation of the output shaft. With two pistons per rotor and a ratio of 2:1, the pistons would make only two steps of 180 degrees each. Stated otherwise, a gear ratio of n:1 provides n steps per rotation, with n steps of 360°/n each.

The crank arms and crankshafts have crank pins 43, 44, which are connected together by connecting rods 46, 47. The throw of the crankshafts is less than that of the crank arms, which enables the crankshafts to rotate continuously even though the pistons and rotors do not.

The relationship between the stepwise movement of the rotors and pistons and the continuous rotation of the output shaft is further illustrated in FIGS. 4A–4E. In these figures, the following designations are used:

| | |
|---|---|
| Sun Gear | S |
| Crankshafts | CS1, CS2 |
| Crank Pins | P1, P2 |
| Planet Gears | G1, G2 |
| Crank Arms | CA1, CA2 |
| Connecting Rods | R1, R2 |

It is assumed that the gear ratio is 4:1, that crankshaft CS1 starts in a bottom dead center (BDC) position, and that crankshaft CS2 starts at top dead center (TDC). In those positions, the crank pins on crankshafts and crank arms are aligned on straight lines which pass through the axes of the crankshafts. In the TDC position, the crank pin is positioned between the crank arm and the axis of the crankshaft, and the crank arm is in its most advanced position, i.e., farthest from the crankshaft axis. In the BDC position, the crank pin is positioned beyond the axis of the crankshaft, and the crank arm is in its least advanced position closer to the crankshaft axis.

Being mounted on a carrier which is affixed to the output shaft, the crankshafts and planet gears rotate about the axis of the output shaft in concert with the output shaft. As the planet gears travel around the sun gear, they rotate the crankshafts continuously about their axes, with the crankshafts and planet gears making one revolution for each 90 degrees of output shaft rotation.

After 22.5 degrees of output shaft rotation, the crankshafts and planet gears will have rotated to the positions shown in FIG. 4B. At this point, in addition to having travelled 22.5 degrees around the sun gear, the crankshafts and planet gears have also rotated 90 degrees about their own axes. The net travel of crank pins P1, P2 is the sum of their travel due to these two rotations.

Since the travel of crank pin P1 due to rotation of planet gear G1 about its own axis is in the same direction as the travel of planet gear G1 about the sun gear, these two components of travel add together to move crank arm CA1 toward its advanced position.

During this portion of the cycle, however, the travel of crank pin P2 due to rotation of planet gear G2 about its own axis is opposite to the direction in which the planet gear is travelling about the sun gear. As a result, these two components of travel offset each other, and crank arm CA2 remains substantially stationary in its original position.

During the next 22.5 degrees of shaft rotation, the crankshafts and planet gears travel another 22.5 degrees about the sun gear and rotate another 90 degrees about their own axes to the positions shown in FIG. 4C, bringing crankshafts CS1, CS2 to their TDC and BDC positions, respectively. During this portion of the cycle, the travel of crank pin P1 due to rotation of the crankshaft and planet gear continues to be in the same direction as the travel around the sun gear, and crank arm CA1 is advanced to its most advanced position. The rotational travel of crank pin CP2 about the crankshaft axis is still opposite to the travel about the sun gear, and these two components continue to offset each other, with crank arm CA2 remaining substantially stationary.

Once crankshaft CS1 has reached TDC, the rotational travel of crank pin P2 about the crankshaft axis is in the same direction as the travel about the sun gear, and the two components add together, with crank arm CA2 beginning to advance. Now, however, the rotational travel of crank pin CA1 about its crankshaft axis is opposite to the direction of travel about the sun gear, and these two components of travel offset each other, with crank arm CA1 remaining substantially stationary. After 22.5 degrees of shaft rotation, the gears will have reached the positions shown in FIG. 4D.

During the next 22.5 degrees of shaft rotation, the crankshafts and planet gears will rotate another 90 degrees about their own axes and will travel another 22.5 degrees around the sun gear to the positions shown in FIG. 4E. In this part of the cycle, the rotational travel of crank pin CP2 is still in the same direction as its travel about the sun gear, and the two components continue to combine and advance crank arm CA2. The rotational travel of crank pin P1 continues to be opposite to its travel about the sun gear, and these two components continue to offset each other, with crank arm CA1 remaining substantially stationary.

At this point, the crankshafts and planet gears have rotated a full 360 degrees about their own axes, they have travelled 90 degrees around the sun gear, and the output shaft has rotated 90 degrees about its axis. The crank arms have also advanced 90 degrees, but in stepwise fashion, as have the pistons and rotors which are connected to them. This cycle repeats four times for each revolution of the output shaft.

Since the output shaft and the rotors are connected together by the connecting rods, they rotate together at the same overall rate, with the rotors making a total of one revolution for each revolution of the output shaft. However, due to the action of the crankshaft and the crank arms, the rotors also, in effect, rock back and forth as they rotate with the output shaft, producing the stepwise rotation.

Since the movement of the crank arms is constrained in part by the circular motion of the crank pins on the crankshaft, the movement of the crank arms and rotors is not linear. It is the slowest when the crankshafts are near TDC and BDC and the circular movement is roughly perpendicular to the connecting rod axes, and it is the fastest when the crankshafts are about midway between TDC and BDC and the circular movement is aligned more closely with rod axes. This nonlinearity results in about 9 degrees of carry through duration which enables the pistons on both rotors to come to rest in substantially the same positions between the intake and exhaust ports at different times.

The relationship between piston travel and output shaft rotation is illustrated more empirically in FIG. 5. The data in this table was obtained by measurements made on a prototype engine having a gear ratio of 4:1. In this example, the cycle starts with a crankshaft at BDC (0°), and a piston on the rotor connected to that crankshaft at a zero degree (0°) reference point.

This data shows that as the output shaft rotates from 10 degrees to 40 degrees, the net piston travel is only 2.5 degrees, and that during the time the piston moves from 15 degrees to 35 degrees, the net piston movement is zero, with the piston actually backing up a small amount as the shaft moves from 25 degrees to 30 degrees. When the shaft reaches the 40 degree point, the piston starts to move more rapidly, going from 12.5 degrees to 90 degrees as the shaft goes from 40 degrees to 90 degrees. For shaft positions between 50 degrees and 85 degrees, the piston travels about 8 to 10 degrees for each 5 degrees of shaft rotation, slowing down again to about the same speed as the shaft when the shaft reaches 85 degrees. Throughout the cycle, the output shaft and the crankshaft rotate continuously and evenly as indicated by the regular intervals in their movement.

The offsetting movements of the crankshafts as they rotate about their own axes and travel about the sun gear effectively lock the rotors and pistons in their substantially stationary positions. While one rotor and the pistons on it are locked, the other rotor and the pistons on it are free to advance. Thus, when combustion occurs, the locked rotor remains substantially stationary, and the pistons on the other rotor are driven ahead with the full force of the expanding gases. The movement of that rotor drives the crankshaft connected to it, and the rotation of the crankshaft causes the planet gear on that crankshaft to travel around the sun gear, rotating the output shaft affixed to the carrier as it does so. On the next power stroke which begins almost immediately, the other rotor is driven, and the crankshaft connected to that rotor drives the output shaft. The shaft turns continuously, receiving 16 power strokes for every 360 degrees of rotation.

The stepwise movement and locking of the rotors is achieved with no interruption or reversal in rotation of the crankshafts, gears and output shaft. This is a major improvement over conventional engines in which the pistons must stop and reverse direction two times for each rotation of the output shaft and four times for each power stroke.

The rotors can be set to bring the confronting faces of the pistons very close together at the beginning and end of each stroke, and the engine can have a very high compression ratio, e.g. 35:1 or higher. As a result, the engine can be operated in a diesel mode, with no spark plugs or ignition wiring and timing. However, if desired, it can also be operated on gasoline or another fuel requiring a spark for combustion, in which case a suitable ignition system can be employed.

The engine operates in a 4-stroke cycle which is illustrated diagrammatically in FIGS. 6A–6I, and with the pistons on the two rotors being designated A1, B1, etc. At the start of the cycle, the rotors are in the positions shown in FIG. 6A, with pistons B1 and B3 forming a seal between intake ports 28 and exhaust ports 29. In these figures, the intake and exhaust ports are represented by arrows labeled IN and EX, respectively.

During the first 45 degrees of shaft rotation, the pistons on rotor A advance approximately 90 degrees to the positions shown in FIG. 6B, with the pistons on rotor B remaining substantially stationary. As the pistons on rotor A advance, the chambers formed between pistons A1, B1 and A3, B3 go through an intake stroke, increasing in volume, and drawing the fuel mixture into themselves through intake ports 28.

During the next 45 degrees of shaft rotation, the pistons on rotor B advance approximately 90 degrees to the positions shown in FIG. 6C, with the pistons on rotor A remaining substantially stationary. As the pistons on rotor B advance, the chambers between pistons A1, B1 and A3, B3 go through a compression stroke, decreasing in volume and compressing the fuel mixture in them.

Compression of the fuel mixture raises its temperature to the point of ignition, and the resulting combustion causes chambers between pistons A1, B1 and A3, B3 to increase in volume, with rotor B remaining substantially stationary and rotor A advancing another 90 degrees to the position shown in FIG. 6D. During this power stroke, the output shaft rotates another 45 degrees.

During the next 45 degrees of shaft rotation, the pistons on rotor B advance approximately 90 degrees to the positions shown in FIG. 6E, with the pistons on rotor A remaining substantially stationary and A1, A3 forming seals between the intake ports and the exhaust ports. As the pistons on rotor B advance, the chambers between pistons A1, B1 and A3, B3 decrease in volume, expelling the spent combustion gases through exhaust ports 29.

Following the exhaust stroke, the cycle repeats, and the chambers between pistons A1, B1 and A3, B3 go through another intake stroke, with the pistons on rotor A advancing to the positions shown in FIG. 6F. During the next 45 degrees of shaft rotation, the pistons on rotor B advance to the positions shown in FIG. 6G, compressing the fuel mixture in these chambers. Combustion of the compressed fuel mixture drives the pistons on rotor A to the positions shown in FIG. 6H, with the output shaft advancing another 45 degrees. During the next 45 degrees of shaft rotation, the pistons on rotor B advance to the positions shown in FIG. 6I, expelling the spent gases and completing the cycle. The pistons and the shaft have now completed 360 degrees of rotation, and the pistons are back in the positions shown in FIG. 6A, ready for the next cycle.

At the same time the chambers formed between pistons A1, B1 and A3, B3 are going through their operating cycle, similar cycles are also occurring in the chambers formed between the other pistons. Thus, for example, as rotor A moves between the positions shown in FIGS. 6A and 6B and an intake stroke is occurring in the chambers between pistons A1, B1 and A3, B3, compression strokes are occurring in the chambers between pistons A1, B2 and A3, B4, power strokes are occurring in the chambers between pistons A2, B2 and A4, B4, and exhaust strokes are occurring in the chambers between pistons A2, B3 and A4, B1.

FIG. 7 shows the strokes occurring in the chambers in 360 degrees of shaft rotation. From this chart, it will be seen that the engine goes through two complete cycles of operation in each one of the eight chambers during each revolution of the output shaft. Thus, there are two power strokes in each chamber, and in two revolutions of the output shaft, there are a total of 32 power strokes in the eight chambers, which is equivalent to a 32 cylinder engine of conventional design.

With working chambers that rotate and share the same space in the toroidal cylinder, the engine achieves a remarkably high displacement in a relatively small space. In one present embodiment, for example, the toroidal cylinder has an outer diameter of 11.25 inches, and each chamber has a diameter of 3.0 inches and a stroke of 3.75 inches, with a total effective displacement of 424 cubic inches in one revolution of the output shaft. With two revolutions of the shaft as in a conventional 4-stroke engine, the engine has an effective displacement of almost 850 cubic inches. When constructed of high strength, lightweight materials, the engine has an overall diameter and length of about 14 inches each, and a weight of about 200 pounds. This is a very substantial and significant improvement over a conventional 6-cylinder inline engine of comparable displacement, which typically would have a length of about 5 feet, a width of about 2 feet, a height of about 4 feet and weight of about 2500 pounds.

Also, the power output is substantially greater than that of a conventional engine of comparable displacement. The 850 cubic inch displacement (C.I.D.) engine described above is believed to be capable of putting out 2000 horsepower, or more, whereas a conventional 850 C.I.D. typically would put out no more than about 400 horsepower.

FIGS. 8–15 illustrate a presently preferred embodiment in which the engine is constructed in a cylindrical housing 51 that includes a central section 52 and end covers 53, 54, with cooling fins on the exterior of all three sections. One end of the housing serves as an engine block 55, and the other houses a crankcase. In the block, circular recesses 56, 57 of semicircular cross section are formed in the confronting faces of central section 52 and cover 53 to form a toroidal chamber or cylinder 58 for the pistons. Radial bores 59, 61 open through the confronting faces and join together to form the intake and exhaust ports. Ring bridges (not shown) span the ports to prevent damage to the piston rings as they travel past the ports.

An output shaft 63 extends coaxially of the housing and projects from the two end covers for connection to other devices. At one end, the shaft has external splines 64, and at the other end it has corresponding internal splines 66 and an annular coupling flange 67. These splines permit two or more of the engines to be readily connected together, or staged, if desired.

A pair of rotors 68, 69 with circumferentially spaced vane-like pistons 71, 72 are disposed coaxially of the output shaft, with the pistons on the two rotors being interposed between each other around cylinder 58. In this embodiment, the rotors and pistons are formed as unitary structures. The pistons are circular in cross section, and have radial faces 73, 74 on opposite sides thereof which intercept an angle of approximately 9 degrees. The rotors have disk-like bodies 68a, 69a, with concavely curved peripheral surfaces 68b, 69b which match the curvature of recesses 56, 57 and serve as part of the cylinder wall.

A seal between the two rotors is provided by a ring 76 in annular grooves 68c, 69c in the inner faces of the rotor disks. Seals between the rotors and the block are provided by rings 77 in annular grooves 68d, 69d in the outer faces of the rotors and the faces of housing section 52 and end cover 53. The pistons have peripheral ring grooves and rings 70 which seal against the wall of the cylinder.

If as in the preferred embodiments, the pistons and cylinder are circular in cross section, conventional piston rings can be used. However, the pistons and cylinder do not have to be circular, and they can have any other cross-sectional contour desired, including rectangular and trapezoidal.

The rotors are connected to crank arms 78, 79 in the crankcase by hollow shafts or sleeves 81, 82 which are similar to hollow shafts 32, 33 in the embodiment of FIGS. 1–3. These shafts are disposed coaxially of output shaft 63, with the inner hollow 81 shaft being rotatively mounted on the output shaft, and outer hollow shaft 82 being rotatively mounted on the inner one. The inner hollow shaft is somewhat longer than the outer one, and rotor 68 and crank arm 78 are affixed to the ends of the outer shaft by splines 83. Rotor 69 and crank arm 79 are likewise affixed to the projecting ends of the inner shaft by splines 84.

Each of the crank arms has two generally radial arms 78a, 78b and 79a, 79b, only one of which is affixed to the hollow shaft. The other arms are rotatively mounted on the output shaft for added strength and stability, with crank pins 78c, 79c extending between the two arms of each crank.

A carriage or carrier 86 is affixed to output shaft 63 by splines 87, and a pair of crankshafts 88, 89 are rotatively mounted on the carrier in diametrically opposite positions. The crankshafts have planet gears 88a, 89a which are formed as an integral part of the crankshafts and mesh with sun gears 91, 92 which are affixed to the housing and disposed coaxially of shaft 63. The crankshafts also have eccentric which are connected to crank pins 78c, 79c on the crank arms by connecting rods 93, 94.

Operation and use of this embodiment is similar to that described above. With four pistons per rotor and a gear ratio of 4:1, this engine also fires 16 times per revolution of the output shaft and 32 times in two revolutions. As noted above, it can deliver upwards of 2000 horsepower from a package measuring only 14 inches in diameter and 14 inches in length, and weighing only about 200 pounds.

If desired, a second stage can be added to the engine of FIGS. 8–15 by adding a second toroidal cylinder to the outboard end of the crankcase and coupling the rotors and pistons in that cylinder to the existing drive mechanism. That is done by extending output shaft 63 through the added cylinder and mounting an additional pair of hollow shafts on the extended portion of the drive shaft, with one end of the hollow shafts being splined to the free arms 78b, 79b of the crank arms, and the other ends being splined to the added rotors. When this is done, a single drive mechanism serves the pistons in two cylinders, and the power of the engine can be doubled without also doubling the size of the engine.

The engine runs very efficiently and can use a variety of alternate fuels as well as diesel fuel and gasoline. It can also be used as an incinerator for burning garbage which has been liquefied and combined with another fuel, with up to about 70 percent of the mixture being garbage. It can also be constructed as a micro engine, and used for applications such as charging battery power packs.

The engine can also be configured for use as a pump by rearranging the ports and driving the output shaft. For a pump, the number of ports is preferably made equal to the number of pistons on the rotors. Thus, for example, with four pistons per rotor, four pairs of inlet and outlet ports are spaced equally around the cylinder. As illustrated in FIGS. 16 and 17 each time a piston advances, it draws fluid into the chamber behind it and discharges fluid from the chamber in front of it. This results in a pump which is capable of high volume, high flow and high pressure, all in one compact unit.

If desired, the pump can be staged with the engine of FIGS. 8–15, with a single drive mechanism being used for both.

The invention has a number of important features and advantages. It provides a very compact and highly efficient engine which can be used in a variety of applications, both large and small, it can burn a variety of fuels and can be operated either in a diesel mode or with a spark ignition. In automotive applications, the high burning efficiency and large displacement provide both very high fuel mileage and high power. The engine has very few parts, and its design is both simple and elegant. It can also be configured as a pump without changing the basic mechanism.

It is apparent from the foregoing that a new and improved internal combustion engine and method have been provided. While only certain presently preferred embodiments have been described in detail, as will be apparent to those familiar with the art, certain changes and modifications can be made without departing from the scope of the invention as defined by the following claims.

What is claimed is:

1. An internal combustion engine, comprising: a toroidal cylinder, a pair of rotors adapted for rotation about the axis of the cylinder, four pistons on each of the rotors dividing the cylinder into eight chambers, an output shaft disposed coaxially of the cylinder, a carrier affixed to the output shaft, a pair of crankshafts rotatively mounted on the carrier, a timing mechanism interconnecting the output shaft and the crankshafts so that the crankshafts make four revolutions for each revolution of the output shaft, and connecting rods interconnecting the rotors and the crankshafts such that the crankshafts rotate continuously and the rotors rotate alternately in stepwise fashion, making one complete revolution for each revolution of the output shaft.

2. The internal combustion engine of claim 1 wherein the timing mechanism comprises a stationary sun gear disposed coaxially of the output shaft, and planetary gears connected to the crankshafts in meshing engagement with the sun gear, the sun gear and planetary gears having a ratio of 4:1 whereby the crankshafts each make four revolutions for one revolution of the output shaft.

3. An internal combustion engine, comprising: a toroidal cylinder, an output shaft disposed coaxially of the cylinder, a sun gear disposed coaxially of the shaft, a carrier affixed to the shaft, a pair of crankshafts rotatively mounted on the carrier with gears on the crankshafts in meshing engagement with the sun gear, a pair of rotors adapted for rotation about the axis of the cylinder, a plurality of pistons on the rotors interposed between each other around the cylinder to divide the cylinder into a plurality of chambers, a pair of cranks each having a pair of radial arms and a crank pin which extends between and is supported symmetrically by the radial arms, means interconnecting respective ones of the rotors and cranks for rotation in concert, and connecting rods interconnecting the crankshafts and the cranks whereby the crankshafts rotate continuously and the rotors rotate alternately in stepwise fashion, making one complete revolution for each revolution of the output shaft.

4. The internal combustion engine of claim 3 wherein there are n pistons on each of the rotors, and the sun and crankshaft gears have a ratio of n:1.

5. The internal combustion engine of claim 3 wherein the means interconnecting the crankshafts and cranks comprises a pair of hollow shafts disposed concentrically about the output shaft and affixed to respective ones of the rotors and cranks.

6. The internal combustion engine of claim 5 wherein one of the radial arms on each of the cranks is affixed to a respective one of the hollow shafts, and the other radial arms are rotatively mounted and supported by on the output shaft.

7. An internal combustion engine, comprising: a toroidal cylinder, a pair of rotors adapted for rotation about the axis of the cylinder, four pistons on each of the rotors interposed between each other and dividing the cylinder into eight chambers, an output shaft disposed coaxially of the cylinder, a sun gear disposed coaxially of the output shaft, a carrier affixed to the output shaft, a pair of crankshafts rotatively mounted on the carrier with gears on the crankshafts in meshing engagement with the sun gear and the sun and crankshaft gears having a ratio of 4:1, and connecting rods interconnecting the rotors and the crankshafts such that the crankshafts rotate continuously and the rotors rotate alternately in stepwise fashion, making one complete revolution for each revolution of the output shaft.

8. A method of operating an internal combustion engine having a toroidal cylinder, an output shaft disposed coaxially of the cylinder, a pair of rotors adapted for rotation about the axis of the cylinder, and four pistons on the rotors dividing the cylinder into eight chambers of variable volume, comprising the steps of: advancing the pistons in stepwise fashion around the cylinder by combustion of a fuel mixture in the chambers, with the rotors rotating in stepwise fashion in concert with the pistons, converting the stepwise rotation of the rotors to continuous rotation of a pair of crankshafts mounted on a carrier affixed to the output shaft, and imparting continuous rotation from the crankshafts to the carrier and the output shaft, with the crankshafts making four rotations for each rotation of the output shaft.

9. The method of claim 8 wherein the stepwise rotation of the rotors is converted to continuous rotation of the crankshafts by cranks connected to the rotors and connecting rods connected between the cranks and the crankshafts, with the cranks having longer throws than the crankshafts.

10. The method of claim 8 wherein the continuous rotation is imparted to the carrier and the output shaft by engaging planet gears connected to the crankshafts with a sun gear disposed coaxially of the output shaft.

11. An internal combustion engine, comprising:
   a. a toroidal cylinder;
   b. an output shaft disposed coaxially of the cylinder;
   c. a first hollow shaft rotatively mounted on the output shaft;
   d. a second hollow shaft rotatively mounted on the first hollow shaft;
   e. a pair of rotors affixed to respective ones of the hollow shafts;
   f. four pistons on each of the rotors with the pistons on the two rotors being interposed between each other around the cylinder and dividing the cylinder into eight chambers;
   g. a sun gear disposed coaxially of the output shaft;
   h. a carrier affixed to the output shaft;
   i. a pair of crankshafts rotatively mounted on the carrier with gears on the crankshafts in meshing engagement with the sun gear for rotating the carrier and the output shaft about the axis of the shaft as the crankshafts rotate about their axes, the sun gear and the gears on the crankshafts having a ratio of 4:1 whereby each of the crankshafts makes four revolutions for one revolution of the output shaft;
   j. a pair of crank arms affixed to respective ones of the hollow shafts; and
   k. connecting rods interconnecting the crank arms and the crankshafts such that crank arms turn alternately in stepwise fashion, with the pistons on one rotor moving a predetermined distance around the cylinder while the pistons on the other rotor remain substantially stationary and the crankshafts and the output shaft rotate continuously.

12. An internal combustion engine, comprising:
   a. a cylindrical housing having a cylinder block and a crankcase toward opposite ends thereof;
   b. a toroidal cylinder formed in the cylinder block;
   c. an output shaft extending axially of the housing;
   d. a first hollow shaft rotatively mounted on the output shaft;
   e. a second hollow shaft rotatively mounted on the first hollow shaft;
   f. a pair of rotors affixed to respective ones of the hollow shafts in the cylinder block;
   g. a plurality of pistons on each of the rotors, with the pistons on the two rotors being interposed between each other around the toroidal cylinder and dividing the toroidal cylinder into a plurality of chambers;
   h. a pair of cranks each having a first radial arm affixed to one of the hollow shafts, a second radial arm rotatively mounted on and supported by the output shaft, and a crank pin extending between the radial arms; and
   i. means including connecting rods interconnecting the crank pins and the output shaft for stepwise rotation of the pistons and rotors and continuous rotation of the output shaft.

13. An internal combustion engine, comprising:
   a. a toroidal cylinder;
   b. intake and exhaust ports arranged in pairs around the cylinder;
   c. an output shaft disposed coaxially of the cylinder;
   d. a first hollow shaft rotatively mounted on the output shaft;
   e. a second hollow shaft rotatively mounted on the first hollow shaft;
   f. a pair of rotors affixed to respective ones of the hollow shafts;
   g. four pistons on each of the rotors, with the pistons on the two rotors being interposed between each other around the cylinder and dividing the cylinder into a plurality of chambers;
   h. a pair of crank arms affixed to respective ones of the hollow shafts for rotation in concert with the rotors and pistons;
   i. a sun gear disposed coaxially of the output shaft;
   j. a carrier affixed to the output shaft;
   k. a pair of crankshafts rotatively mounted on the carrier;
   l. connecting rods interconnecting the crank arms and the crankshafts such that the crankshafts rotate continuously as the crank arms turn alternately in stepwise fashion, with the pistons on one rotor remaining substantially stationary and forming seals between the intake and exhaust ports while the pistons on the other rotor advance, drawing fuel into chambers in communication with the intake ports and expelling exhaust gas from chambers in communication with the exhaust ports; and
   m. gears on the crankshafts in meshing engagement with the sun gear for rotating the carrier and the output shaft continuously about the axis of the output shaft as the pistons move in stepwise fashion and the crankshafts rotate about their axes, the sun gear and the gears on the crankshafts having a ratio of 4:1 whereby each of the crankshafts makes four revolutions for one revolution of the output shaft.

14. A machine for converting between continuous rotation and stepwise rotation, comprising: a shaft, a sun gear disposed coaxially of the shaft, a carrier affixed to the shaft, a crankshaft having an eccentric crank pin rotatively mounted on the carrier with a planet gear in meshing engagement with the sun gear so that the shaft and the crankshaft rotate continuously about their axes as the planet gear travels about the sun gear, a rotatively mounted crank having a pair of radial arms and a crank pin extending between and supported at both ends by the radial arms, and a connecting rod interconnecting the crank pins on the crankshaft and the crank such that as the crankshaft rotates continuously, the crank rotates in stepwise fashion, advancing when movement of the crank pin due to rotation of the crankshaft adds to movement of the pin due to travel of the planet gear around the sun gear and remaining substantially stationary when the movement of the crank pin due to crankshaft rotation offsets the movement of the pin due to planet gear travel.

15. A machine for converting between continuous rotation and stepwise rotation, comprising: a shaft, a sun gear disposed coaxially of the shaft, a carrier affixed to the shaft, first and second crankshafts with eccentric crank pins rotatively mounted on the carrier with planet gears in meshing engagement with the sun gear so that the crankshafts rotate continuously about their axes as the planet gears travel around the sun gear, first and second rotatively mounted cranks each having a pair of radial arms and a crank pin extending between and supported at both ends by the radial arms, and first and second connecting rods interconnecting the crank pins on the crankshafts and the cranks such that as the crankshafts rotate continuously, the cranks rotate in stepwise fashion, advancing when movement of the crank pins due to rotation of the crankshafts adds to movement of the pins due to travel of the planet gears around the sun gear and remaining substantially stationary when the movement of the crank pins due to crankshaft rotation offsets the movement of the pins due to planet gear travel.

16. The machine of claim 15 wherein the crank pins on the two crankshafts are phased 180 degrees apart so that one of the cranks remains substantially stationary while the other advances.

17. A method of operating an internal combustion engine having a toroidal cylinder, two pairs of intake and exhaust ports disposed on opposite sides of the cylinder, an output shaft disposed coaxially of the cylinder, a pair of rotors adapted for rotation about the axis of the cylinder, and four pistons on each of the rotors interposed between each other around the cylinder to divide the cylinder into eight chambers, comprising the steps of: advancing the pistons in stepwise fashion around the cylinder by combustion of a fuel mixture in the chambers, with the pistons on one of the rotors remaining substantially stationary between the intake and exhaust ports and the pistons on the other rotor advancing to draw fuel into chambers in communication with the intake ports and expel exhaust gas from chambers in communication with the exhaust ports, converting stepwise rotation of the rotors to continuous rotation of a pair of crankshafts mounted on a carrier affixed to the output shaft, and imparting continuous rotation from the crankshafts to the carrier and the output shaft, with each of the crankshafts making four rotations for one rotation of the output shaft.

18. The method of claim 17 wherein the stepwise rotation of the rotors is converted to continuous rotation of the crankshafts by cranks connected to the rotors and connecting rods connected between the cranks and the crankshafts, with the cranks having longer throws than the crankshafts.

19. The method of claim 17 wherein the continuous rotation is imparted to the carrier and the output shaft by engaging planet gears connected to the crankshafts with a gear disposed coaxially of the output shaft.

20. An internal combustion engine, comprising:
   a. a cylindrical housing having a cylinder block and a crankcase toward opposite ends thereof;
   b. a toroidal cylinder formed in the cylinder block;
   c. an output shaft extending axially of the housing;
   d. a first hollow shaft rotatively mounted on the output shaft;
   e. a second hollow shaft rotatively mounted on the first hollow shaft;
   f. a pair of rotors affixed to respective ones of the hollow shafts in the cylinder block;
   g. four pistons on each of the rotors, with the pistons on the two rotors being interposed between each other around the toroidal cylinder and dividing the toroidal cylinder into eight chambers;
   h. means interconnecting the hollow shafts and the output shaft in the crankcase for stepwise rotation of the pistons and rotors and continuous rotation of the output shaft.

21. The internal combustion engine of claim 20 wherein the means interconnecting the hollow shafts and the output shaft comprises:

(1) a pair of crank arms affixed to respective ones of the hollow shafts for rotation in concert with the rotors;

(2) a carrier affixed to the output shaft;

(3) a pair of crankshafts rotatively mounted on the carrier;

(4) a sun gear disposed coaxially of the output shaft;

(5) gears on the crankshafts in meshing engagement with the sun gear for rotating the carrier and the output shaft about the axis of the output shaft as the crankshafts rotate about their axes, the sun gear and the gears on the crankshafts having a ratio of 4:1 and the crankshafts make four revolutions for one revolution of the output shaft; and (6) connecting rods interconnecting the crank arms and the crankshafts.

22. The internal combustion engine of claim 20 including two pairs of intake and exhaust ports positioned on opposite sides of the toroidal cylinder.

23. The internal combustion engine of claim 20 wherein there are n pistons on each of the rotors, n/2 pairs of intake and exhaust ports are spaced equally around the cylinder, and the sun and crankshaft gears have a ratio of n:1.

24. An internal combustion engine, comprising:
   a. a toroidal cylinder;
   b. two pairs of intake and exhaust ports disposed on opposite sides of the cylinder;
   c. an output shaft disposed coaxially of the cylinder;
   d. a sun gear disposed coaxially of the output shaft;
   e. a carrier affixed to the output shaft;
   f. a pair of crankshafts rotatively mounted on the carrier;
   g. a pair of rotors adapted for rotation about the axis of the cylinder;
   h. four pistons on each of the rotors interposed between each other and dividing the cylinder into a plurality of chambers;
   i. connecting rods interconnecting the rotors and the crankshafts such that the crankshafts rotate continuously as the rotors turn alternately in stepwise fashion, with the pistons on one rotor remaining substantially stationary and forming seals between the intake and exhaust ports while the pistons on the other rotor advance, drawing fuel into chambers in communication with the intake ports and expelling exhaust gas from chambers in communication with the exhaust ports; and
   j. gears on the crankshafts in meshing engagement with the sun gear for rotating the carrier and the output shaft continuously about the axis of the output shaft as the pistons move in stepwise fashion and the crankshafts rotate about their axes, the sun and crankshaft gears having a ratio of 4:1 and the crankshafts making four revolutions for each revolution of the output shaft.

25. The internal combustion engine of claim 24 wherein the pistons remain substantially stationary and form seals between the intake and exhaust ports for about 9 degrees of output shaft rotation.

26. An internal combustion engine, comprising:
   a. a toroidal cylinder;
   b. an output shaft disposed coaxially of the cylinder;
   c. a first hollow shaft rotatively mounted on the output shaft;
   d. a second hollow shaft rotatively mounted on the first hollow shaft;
   e. a pair of rotors affixed to respective ones of the hollow shafts;

f. a plurality of pistons on the rotors with the pistons on the two rotors being interposed between each other around the cylinder and dividing the cylinder into a plurality of chambers;

g. a sun gear disposed coaxially of the output shaft;

h. a carrier affixed to the output shaft;

i. a pair of crankshafts rotatively mounted on the carrier with gears on the crankshafts in meshing engagement with the sun gear for rotating the carrier and the output shaft about the axis of the shaft as the crankshafts rotate about their axes;

j. a pair of cranks each having a first radial arm affixed to a respective one of the hollow shafts, a second radial arm rotatively mounted on and supported by the output shaft, and a crank pin extending between and supported symmetrically by the radial arms; and k. connecting rods interconnecting the cranks and the crankshafts such that crank arms turn alternately in stepwise fashion, with the pistons on one rotor moving a predetermined distance around the cylinder while the pistons on the other rotor remain substantially stationary and the crankshafts and the output shaft rotate continuously.

27. An internal combustion engine, comprising:
a. a toroidal cylinder;
b. intake and exhaust ports arranged in pairs around the cylinder;
c. an output shaft disposed coaxially of the cylinder;
d. a sun gear disposed coaxially of the output shaft;
e. a carrier affixed to the output shaft;
f. a pair of crankshafts rotatively mounted on the carrier;
g. a pair of rotors adapted for rotation about the axis of the cylinder;
h. a plurality of pistons on the rotors interposed between each other around the cylinder to divide the cylinder into a plurality of chambers;
i. a pair of cranks each having a pair of radial arms and a crank pin which extends between and is supported symmetrically by the radial arms:
j. means interconnecting respective ones of the rotors and cranks for rotation in concert;
k. connecting rods interconnecting the crankshafts and the rotors such that the crankshafts rotate continuously as the rotors turn alternately in stepwise fashion, with the pistons on one rotor remaining substantially stationary and forming seals between the intake and exhaust ports while the pistons on the other rotor advance, drawing fuel into chambers in communication with the intake ports and expelling exhaust gas from chambers in communication with the exhaust ports; and
l. gears on the crankshafts in meshing engagement with the sun gear for rotating the carrier and the output shaft continuously about the axis of the output shaft as the pistons move in stepwise fashion and the crankshafts rotate about their axes.

28. The internal combustion engine of claim 27 wherein there are four pistons on each of the rotors, two pairs of intake and exhaust ports, and the ratio between the sun and crankshaft gears is 4:1.

29. The internal combustion engine of claim 27 wherein the means interconnecting the crankshafts and cranks comprises a pair of hollow shafts disposed concentrically about the output shaft and affixed to respective ones of the rotors and cranks.

30. The internal combustion engine of claim 29 wherein one of the radial arms on each of the cranks is affixed to a respective one of the hollow shafts, and the other radial arms are rotatively mounted and supported by on the output shaft.

31. A machine comprising:
a. first and second toroidal cylinders positioned side-by-side;
b. a common shaft disposed coaxially of the cylinders;
c. first and second sets of hollow shafts disposed coaxially of the common shaft, with each set comprising a first hollow shaft which is rotatively mounted on the common shaft and a second hollow shaft which is rotatively mounted on the first hollow shaft;
d. a first pair of rotors affixed to respective ones of the hollow shafts in the first set;
e. a plurality of pistons on the rotors in the first set with the pistons on the two rotors being interposed between each other around the first cylinder and dividing the first cylinder into a plurality of chambers;
f. a second pair of rotors affixed to respective ones of the hollow shafts in the second set;
g. a plurality of pistons on the rotors in the second set with the pistons on the two rotors being interposed between each other around the second cylinder and dividing the second cylinder into a plurality of chambers;
h. a sun gear disposed coaxially of the common shaft;
i. a carrier affixed to the common shaft;
j. a pair of crankshafts rotatively mounted on the carrier with gears on the crankshafts in meshing engagement with the sun gear for rotating the carrier and the common shaft about the axis of the shaft as the crankshafts rotate about their axes;
k. a pair of crank arms affixed to corresponding ones of the hollow shafts in the two sets for movement in concert with the rotors; and
l. connecting rods interconnecting the crank arms and the crankshafts such that the crankshafts rotate continuously as the rotors turn alternately in stepwise fashion, with the pistons on one of the rotors in each of the cylinders moving a predetermined distance around the cylinder while the pistons on the other rotors remain substantially stationary.

32. An internal combustion engine, comprising:
a. a toroidal cylinder;
b. intake and exhaust ports arranged in pairs around the cylinder;
c. an output shaft disposed coaxially of the cylinder;
d. a first hollow shaft rotatively mounted on the output shaft;
e. a second hollow shaft rotatively mounted on the first hollow shaft;
f. a pair of rotors affixed to respective ones of the hollow shafts;
g. a plurality of pistons on the rotors, with the pistons on the two rotors being interposed between each other around the cylinder and dividing the cylinder into a plurality of chambers;
h. a pair of cranks each having a first radial arm affixed to a respective one of the hollow shafts, a second radial arm rotatively mounted on and supported by the output shaft, and a crank pin extending between the radial arms;
i. a sun gear disposed coaxially of the output shaft;

j. a carrier affixed to the output shaft;

k. a pair of crankshafts rotatively mounted on the carrier;

l. connecting rods interconnecting the crank arms and the crankshafts such that the crankshafts rotate continuously as the crank arms turn alternately in stepwise fashion, with the pistons on one rotor remaining substantially stationary and forming seals between the intake and exhaust ports while the pistons on the other rotor advance, drawing fuel into chambers in communication with the intake ports and expelling exhaust gas from chambers in communication with the exhaust ports; and m. gears on the crankshafts in meshing engagement with the sun gear for rotating the carrier and the output shaft continuously about the axis of the output shaft as the pistons move in stepwise fashion and the crankshafts rotate about their axes.

33. An internal combustion engine, comprising:

a. first and second toroidal cylinders positioned side-by-side;

b. intake and exhaust ports arranged in pairs around each of the two cylinders;

c. a common shaft disposed coaxially of the two cylinders;

d. first and second sets of hollow shafts disposed coaxially of the common shaft, with each set comprising a first hollow shaft which is rotatively mounted on the common shaft and a second hollow shaft which is rotatively mounted on the first hollow shaft;

e. a first pair of rotors affixed to respective ones of the hollow shafts in the first set;

f. a plurality of pistons on the rotors in the first pair with the pistons on the two rotors being interposed between each other around the first cylinder and dividing the first cylinder into a plurality of chambers;

g. a second pair of rotors affixed to respective ones of the hollow shafts in the second set;

h. a plurality of pistons on the rotors in the second pair with the pistons on the two rotors being interposed between each other around the second cylinder and dividing the second cylinder into a plurality of chambers;

i. a sun gear disposed coaxially of the common shaft;

j. a carrier affixed to the common shaft;

k. a pair of crankshafts rotatively mounted on the carrier with gears on the crankshafts in meshing engagement with the sun gear for rotating the carrier and the common shaft about the axis of the shaft as the crankshafts rotate about their axes;

l. a pair of crank arms affixed to corresponding ones of the hollow shafts in the two sets for rotation in concert with the rotors; and m. connecting rods interconnecting the crank arms and the crankshafts such that the crankshafts rotate continuously as the rotors turn alternately in stepwise fashion, with the pistons on one rotor in each of the cylinders remaining substantially stationary and forming seals between the intake and exhaust ports while the pistons on the other rotor in each cylinder advance, drawing fuel into chambers in communication with the intake ports and expelling exhaust gas from chambers in communication with the exhaust ports.

34. The internal combustion engine of claim 33 wherein each of the cranks has first and second arms affixed to corresponding ones of the hollow shafts in the two sets and a crank pin extending between and supported symmetrically by the arms.

35. An internal combustion machine, comprising:

a. first and second toroidal cylinders positioned side-by-side;

b. intake and exhaust ports arranged in pairs around the first cylinder;

c. inlet and outlet ports arranged in pairs around the second cylinder;

d. a common shaft disposed coaxially of the cylinders;

e. first and second sets of hollow shafts disposed coaxially of the common shaft, with each set comprising a first hollow shaft which is rotatively mounted on the common shaft and a second hollow shaft which is rotatively mounted on the first hollow shaft;

f. a first pair of rotors affixed to respective ones of the hollow shafts in the first set;

g. a plurality of pistons on the rotors in the first pair with the pistons on the two rotors being interposed between each other around the first cylinder and dividing the first cylinder into a plurality of chambers;

h. a second pair of rotors affixed to respective ones of the hollow shafts in the second set;

i. a plurality of pistons on the rotors in the second pair with the pistons on the two rotors being interposed between each other around the second cylinder and dividing the second cylinder into a plurality of chambers;

j. a sun gear disposed coaxially of the common shaft;

k. a carrier affixed to the common shaft;

l. a pair of crankshafts rotatively mounted on the carrier with gears on the crankshafts in meshing engagement with the sun gear for rotating the carrier and the common shaft about the axis of the shaft as the crankshafts rotate about their axes;

m. a pair of crank arms affixed to corresponding ones of the hollow shafts in the two sets for rotation in concert with the rotors; and n. connecting rods interconnecting the crank arms and crankshafts such that the crankshafts rotate continuously as the rotors turn alternately in stepwise fashion, with (1) the pistons on one of the rotors in the first cylinder remaining substantially stationary and forming seals between the intake and exhaust ports while the pistons on the other rotor in the first cylinder advance, drawing fuel into chambers in communication with the intake ports and expelling exhaust gas from chambers in communication with the exhaust ports, and (2) the pistons on one of the rotors in the second cylinder remaining substantially stationary and forming seals between the inlet and outlet ports while the pistons on the other rotor in the second cylinder advance, drawing fluid into chambers in communication with the inlet ports and expelling fluid from chambers in communication with the outlet ports.

* * * * *